United States Patent [19]
Lee

[11] Patent Number: 5,982,872
[45] Date of Patent: Nov. 9, 1999

[54] METHOD FOR SETTING UP AN ADAPTIVE INTEREXCHANGE SIGNALING SYSTEM IN AN ELECTRONIC SWITCHING SYSTEM

[75] Inventor: Jung-Hun Lee, Incheon, Rep. of Korea

[73] Assignee: Daewoo Telecom, Ltd., Incheon, Rep. of Korea

[21] Appl. No.: 08/954,963

[22] Filed: Oct. 21, 1997

[30] Foreign Application Priority Data

Dec. 10, 1996 [KR] Rep. of Korea ............ 96-63859

[51] Int. Cl.⁶ .................................................. H04M 7/00
[52] U.S. Cl. ........................ 379/229; 379/232; 370/384
[58] Field of Search .................................. 379/229, 230, 379/260, 242, 243, 244, 245, 246; 370/466, 467

[56] References Cited

U.S. PATENT DOCUMENTS 954,963  8/1910  Gertsman et al. ................. 379/232

*Primary Examiner*—Krista Zele
*Assistant Examiner*—David Huynh
*Attorney, Agent, or Firm*—Pennie & Edmonds LLP

[57] ABSTRACT

A method, in an electronic switching system comprising a main processor and line processors which can adapt K number of signaling types, N and K being positive integers, respectively, wherein the system is connected to another electronic switching system at trunk ports through trunk lines and the main processor includes a database for the line processors, route data, prefix data and state of the trunks including the trunk lines and the trunk ports, comprises the steps of: identifying a signaling type of a line processor; informing the identified signaling type to an operator; checking whether the trunk port connected to the line processor adapts the identified signaling type or not if the operator decides to change the identified signaling type; deleting data of the trunk in the main processor's database and assigning a new signaling type to the line processor if said trunk port adapts the identified signaling type, wherein the new signaling type is a same signaling type as used in said another electronic switching system connected thereto; assigning the new signaling type to the line processor if said trunk port does not adapt the identified signaling type; changing data of the line processor in the main processor's database into data concerning said new signaling type; and generating route data, making new data of the trunk and generating prefix data in the main processor's database.

4 Claims, 2 Drawing Sheets

METHOD FOR SETTING UP AN ADAPTIVE INTEREXCHANGE SIGNALING SYSTEM IN AN ELECTRONIC SWITCHING SYSTEM

FIELD OF THE INVENTION

The present invention relates to an electronic switching system; and more particularly, to a method for setting up an adaptive interexchange signaling system in an electronic switching system.

BACKGROUND OF THE INVENTION

In an electronic switching system (ESS), a signaling refers to a transmission of switching information between a subscriber and an exchange or between two exchanges.

A signaling for exchanging information between a subscriber and an exchange is called a subscriber line signaling, wherein the information includes, e.g., a call request signal, a call release signal, address signals, a ringing signal, a metering pulse and tones and recorded announcements.

A signaling for exchanging information between two exchanges is called an interexchange signaling. The interexchange signaling includes a line signal and a register signal. The line signal represents the state of an interexchange trunk line, e.g., a seizure signal, a release signal, called party on/off supervisory signals and relates to the state of a called line. The register signal is a signal interchanged between two registers or two similar control equipments. The register signal generally includes a proceed-to-send signal, an address signal and signals indicating the result of a call attempt.

There are a plurality of types of the interexchange signalings. Especially, in an R1 signaling, the line signal uses a frequency of 2600 Hz in transmission lines. The register signal is made of two frequencies out of six frequencies and may be transmitted on a link-by-link basis, wherein the six frequencies used in the R1 register signals are 700, 900, 1100, 1300, 1500 and 1700 Hz.

In an R2 signaling, the line signal uses a frequency of 3825 Hz in transmission lines. The register signal uses two frequencies out of six frequencies and may be transmitted on an end-to-end basis, wherein the six frequencies used in the R2 register signals are 1380, 1500, 1620, 1740, 1860 and 1980 Hz for forward signaling and 1140, 1020, 900, 780, 660 and 540 Hz for backward signaling.

As described above, each of interexchange signaling types has a different format from one another and different interexchange signaling type is used in different region or nation.

Since, however, the ESS can interchange the information with another ESS only if the interexchange signalings in two ESS's are identical, e.g., an ESS adapting the R1 signaling can interface only with an ESS adapting the R1 signaling and an ESS adapting R2 signaling can interface only with an ESS adapting R2 signaling, the ESS lacks flexibility in the interexchange signaling between exchanges.

SUMMARY OF THE INVENTION

It is, therefore, the primary object of the present invention to provide a method for an electronic switching system enabling to adapt two or more interexchange signalings.

In accordance with the present invention, there is an adaptive method for setting-up an interexchange signaling system in an electronic switching system comprising N number of line processors which can adapt K number of signaling types, N and K being positive integers, respectively, and a main processor, wherein the electronic switching system is connected to another electronic switching system at trunk ports through trunk lines and the main processor includes a database for the line processors, route data, prefix data and state of the trunks including the trunk lines and the trunk ports, comprising the steps of:

(a) identifying a signaling type of a line processor;

(b) informing the identified signaling type at step (a) to an operator who decides whether or not to change the identified signaling type;

(c) checking whether the trunk port connected to the line processor adapts the identified signaling type or not if the operator decides to change the identified signaling type;

(d) deleting data of the trunk in the database of the main processor and assigning a new signaling type to the line processor if the trunk port connected to the line processor adapts the identified signaling type, wherein the new signaling type is a same signaling type as used in said another electronic switching system connected thereto;

(e) assigning the new signaling type to the line processor if the trunk port connected to the line processor does not adapt the identified signaling type;

(f) changing data of the line processor in the main processor's database into the data of the new signaling type; and (g) generating route data, making new data of the trunks and generating prefix data in the database of the main processor.

BRIEF DESCRIPTION OF THE DRAWINGS

The above and other objects and features of the present invention will become apparent from the following description of preferred embodiments in conjunction with the accompanying drawings, in which.

DETAILED DESCRIPTION OF THE PREFERRED EMBODIMENT

Figure 1:
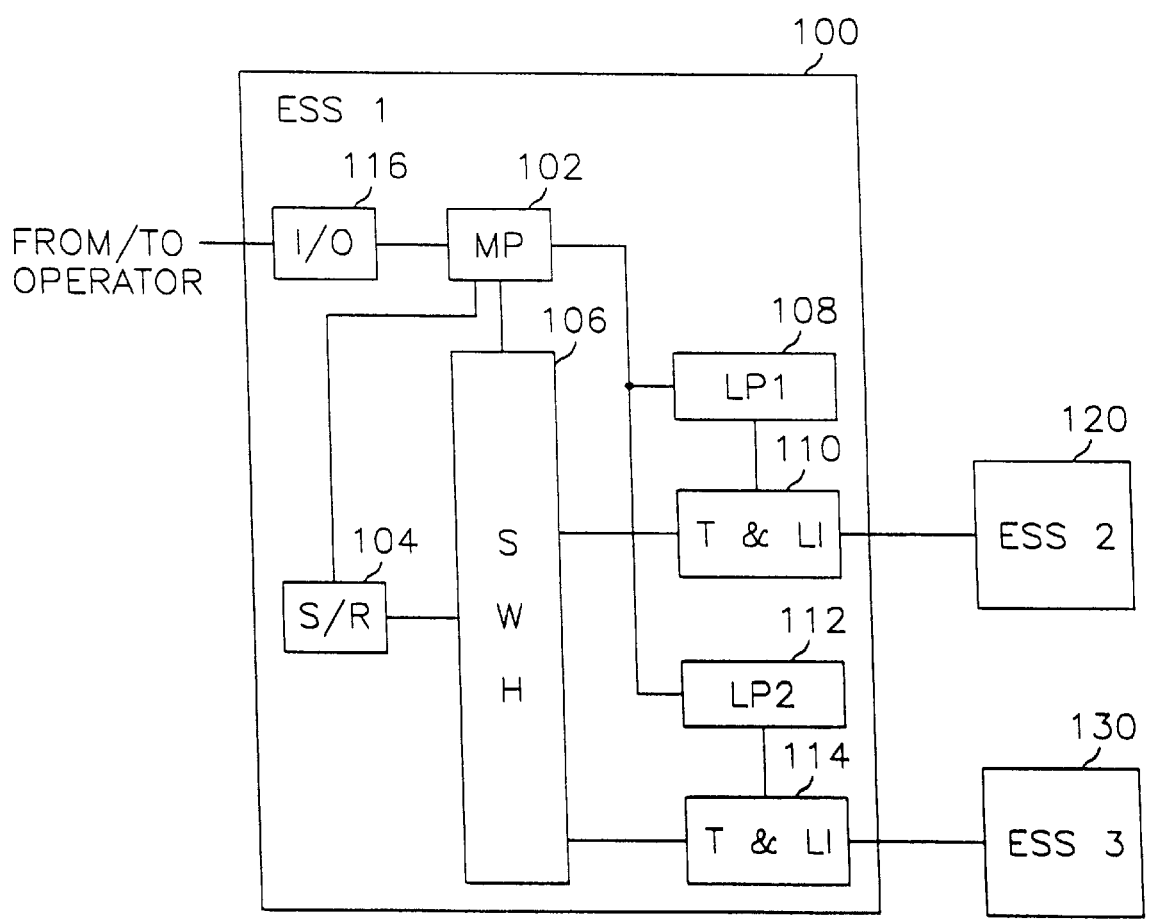
FIG. 1 shows a schematic block diagram of three electronic switching systems adapting the method in accordance with the present invention.

Referring to FIG. 1, there is depicted a schematic block diagram of three electronic switching systems (ESS's) for representing interfacing relations with each other in accordance with the present invention.

An ESS1 100 is coupled to an ESS2 120 and an ESS3 130 through a number of trunk lines, wherein the ESS2 120 is assumed to adapt the R2 signaling, the ESS3 130 is assumed to adapt the R1 signaling and the ESS1 100 is assumed to adapt an R1 signaling for the sake of illustration.

The ESS1 100 comprises a main processor MP 102, a register signal sender and receiver S/R 104, a switching block SWH 106, two line processors LP1 108 and LP2 112, two trunk line and subscriber line interface blocks T&LI's 110 and 114 and an input and output block I/O 116.

The MP 102 controls the overall operation including, e.g., address digit translation, call processing, charging, a switching control and a system operation & maintenance besides controlling the LP1 108 and the LP2 112 and has a database for the line processors, state of trunks including trunk lines and trunk ports, route data and prefix data.

The LP1 108 and the LP2 112 supervise the trunks and notify the state of the trunks to the MP 102 and control the system's interfacing with a number of trunk lines coupled to another ESS and a number of subscribers according to commands of the MP 102, wherein the system's interfacing with a number of subscribers is not shown for the sake of simplicity of explanation.

The T&LI blocks 110 and 114 are connected to another ESS's through a number of trunk lines at trunk ports corresponding to the trunk lines. Among the trunk lines, some of the trunk lines are connected to another ESS's and the others are idle, wherein the trunk lines includes incoming trunk lines and outgoing trunk lines. The T&LI blocks 110 and 114 may send and receive line signals which employ two or more different formats depending on the interexchange signaling types, e.g., an R1 signaling type and an R2 signaling type, under the control of the LP1 108 and the LP2 112, respectively.

The S/R block 104 may send and receive register signals which employ two or more different formats depending on the interexchange signaling types, e.g., an R1 signaling type and an R2 signaling type, under the control of the MP 102.

The SWH 106 switches the information from the T&LI block 110 to the other T&LI block 114 with the help of the S/R block 104 and the MP 102 and vice versa. The I/O block 116 interfaces the ESS1 100 with an operator (not shown).

In the prior art, T&LI blocks and an S/R block can send or receive information by using the format of only one interexchange signaling type, but in the present invention, the T&LI blocks 110 and 114 and the S/R block 104 can send or receive the information whose formats are made by using two or more interexchange signaling types.

Figure 2:
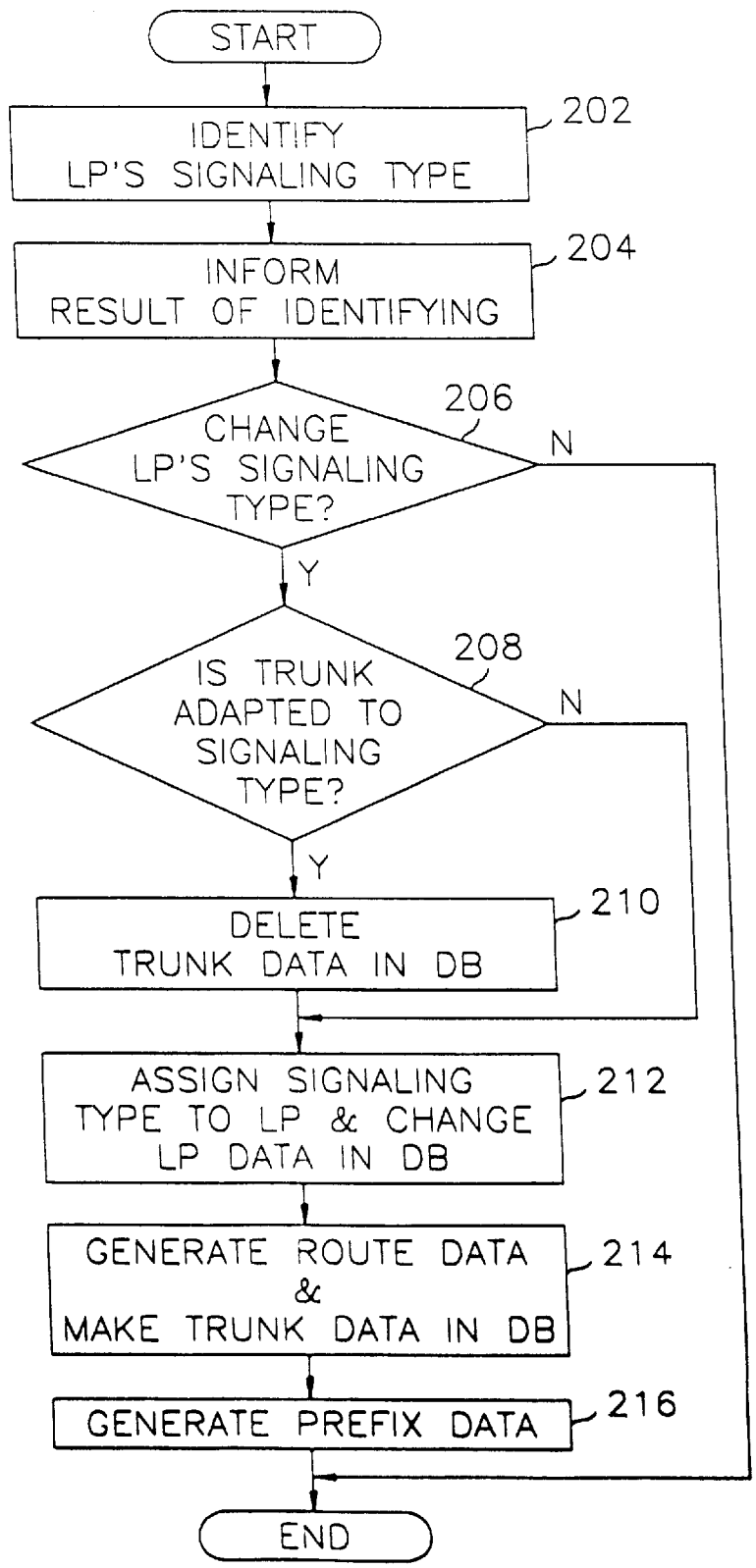
FIG. 2 illustrates a flow chart of a procedure for setting up an interexchange signaling system in the electronic switching system.

Referring to FIG. 2, there is depicted a flow chart of procedures for setting up an adaptive interexchange signaling system of the ESS1 100 for coupling to the ESS2 120 and the ESS3 130.

At first, the MP 102 checks the database concerning the LP1 108 in the MP 102 and identifies the signaling type of the LP1 108 at step 202, wherein since the ESS1 100 adapts the R1 signaling for interexchange signaling, the signaling type of the LP1 108 is the R1 signaling.

At step 204, the MP 102 informs the identified signaling type of the LP1 108 to the operator by using the I/O block 116. The operator determines whether or not to change the signaling type of the LP1 108 at step 206. In this case, the operator will decide to change the signaling type of the LP1 108, since the LP1 108 adapting the R1 signaling is connected to the ESS2 120 which adapts the R2 signaling.

When the operator decides to change the signaling type of the LP1 108, the MP 102 checks if the trunk port in T&LI block 110 connected to the LP1 108 adapts the signaling type, e.g., the R1 signaling type at step 208. If the trunk port connected to the LP1 108 adapts the signaling type, e.g., the R1 signaling type, in T&LI block 110, the MP 102 deletes data of the trunk connected to the LP1 108 in the database of the MP 102 at step 210, wherein the trunk includes incoming trunks, outgoing trunks; and if the trunk port connected to the LP1 108 does not adapt the signaling type, e.g., the R1 signaling type, the process for setting up the interexchange signaling system of the LP1 108 skips to step 212.

At step 212, the MP 102 assigns the signaling type changed at step 206, the R2 signaling, to the LP1 108 and changes the signaling type data of the LP1 108 into the R2 signaling type data in the MP's database. After changing the database of the MP 102, the MP 102 generates new route data for the signal incoming from the LP1 108 and makes new data of the trunks in the database of the MP 102 at step 214. At last, the MP 102 generates prefix data.

Above process is described for the LP1 108 which is coupled to the ESS2 120 adapting a signaling type different from the ESS1 100. However, for the LP2 112 that is coupled to the ESS3 130, the process will be stopped at step 206 since the signaling type of the ESS3 130 is identical to that of the ESS1 100.

By setting up an interexchange signaling system in this way, the ESS1 100 can exchange switching information with any ESS regardless of the interexchange signaling type.

In the preferred embodiment, the ESS1 100 is assumed to have two line processors LP1 108 and LP2 112, for the sake of simplicity of explanation, but if the ESS1 100 has a plurality of line processors, assigning the signaling type to each of the line processors at step 212 will be decided based on the signaling type of an ESS connected thereto.

While the present invention has been shown and described with respect to the particular embodiments, it will be apparent to those skilled in the art that many changes and modifications may be made without departing from the spirit and scope of the invention as defined in the appended claims.

What is claimed is:

1. A method for setting-up an interexchange signaling system in an electronic switching system comprising N number of line processors which can adapt K number of signaling types, N and K being positive integers, respectively, and a main processor, wherein the electronic switching system is connected to another electronic switching system at trunk ports through trunk lines and the main processor includes a database for the line processors, route data, prefix data and state of trunks including the trunk lines and the trunk ports, comprising the steps of:

(a) identifying a signaling type of a line processor;

(b) informing the identified signaling type at step (a) to an operator who decides whether or not to change the identified signaling type;

(c) checking whether the trunk port connected to the line processor adapts the identified signaling type or not if the operator decides to change the identified signaling type;

(d) deleting the data of the trunk in the database of the main processor and assigning a new signaling type to the line processor if the trunk port connected to the line processor adapts the identified signaling type, wherein the new signaling type is a same signaling type as used in said another electronic switching system connected thereto;

(e) assigning the new signaling type to the line processor if the trunk port connected to the line processor does not adapt the identified signaling type;

(f) changing data of the line processor in the main processor's database into the data of the new signaling type; and (g) generating route data, making new data of the trunks and generating prefix data in the database of the main processor.

2. A method according to the claim 1, wherein the positive integer K is 2.

3. A method according to the claim 1, wherein the signaling type assigned to the line processor is an R1 signaling and the new signaling type assigned to the line processor at step (d) and step (e) is an R2 signaling.

4. A method according to the claim 1, wherein the signaling type assigned to the line processor is an R2 signaling and the new signaling type assigned to the line processor at step (d) and step (e) is an R1 signaling.

* * * * *